Sept. 7, 1965   P. D. BARLOW ETAL   3,204,289
SCREW CONVEYING APPARATUS
Filed Aug. 22, 1962   2 Sheets-Sheet 1

INVENTORS
PAUL D. BARLOW
JAMES G. SIMS
BY
Stanley M. Tarter
ATTORNEY

Sept. 7, 1965    P. D. BARLOW ETAL    3,204,289
SCREW CONVEYING APPARATUS

Filed Aug. 22, 1962    2 Sheets-Sheet 2

INVENTORS
PAUL D. BARLOW
JAMES G. SIMS
BY Stanley M. Tarter
ATTORNEY

United States Patent Office 3,204,289
Patented Sept. 7, 1965

3,204,289
SCREW CONVEYING APPARATUS
Paul D. Barlow and James G. Sims, Pensacola, Fla., assignors to Monsanto Company, a corporation of Delaware
Filed Aug. 22, 1962, Ser. No. 218,758
6 Claims. (Cl. 18—8)

The present invention relates to screw conveying apparatus for propelling material from one point to another. More particularly, the present invention relates to screw conveying apparatus for propelling and melting thermoplastic material in particulate form, the resulting melt being extruded into textile filaments or the like.

In a conventional procedure for producing textile filaments by melt spinning, polymer in flake or chip-like form is brought into contact with a heated grid disposed within a melting container. The melter grid can be in the form of platens, fins or the like and is heated internally, usually by means of hot vapors. As the flakes fuse, the resulting melt gravitates from the grid and is collected in the bottom of the container as a pool of molten polymer. Then, the melt is distributed to metering pumps by a melt pool gear pump or by a static pressure head of an inert gas maintained above the melt pool. The metering pumps propel the melt through orifices in a spinneret. The molten polymer streams issuing from the spinneret are cooled and caused to solidify into individual filaments.

It has long been known that restricted heat transfer is experienced when a conventional melter grid is employed in melt spinning apparatus. Three major components of thermal resistance determine the heat transfer rate in the melter grid system; these include vapor-metal interfacial resistance, conductance through the metal wall of the grid, and metal-polymer interfacial resistance. There is good reason to believe that about 65–75% of the total thermal resistance is due to the metal-polymer interfacial resistance. Principal reasons for such are: that in common with all dielectric materials, organic polymers are poor conductors of heat; and that the high viscosity of the polymer melt permits thick films of relatively stagnant polymer to form at the metal surface. Such conditions also contribute significantly to the formation and accumulation of decomposition products commonly referred to as polymer gels. The gelled polymer adheres to the melting grid, thereby effecting an undesirable build-up of an insulating layer of polymer which further reduces the rate of heat transfer.

Furthermore, under the action of gravity alone the viscous melt simply cannot flow along the grid surface rapidly enough to maintain a thin polymer film. As the viscosity of the melt is increased, the melting capacity of the grid is greatly reduced. For example, one type of standard melting grid at normal operating temperature will melt slightly more than double the amount of nylon-66 per unit of time when the polymer has a melt viscosity of 1100 poises as compared to when the polymer has a melt viscosity of 1500 poises.

Grid melting capacity cannot be increased to a large extent practically by increasing the heat flux (heat energy permit unit area per unit time) but rather is increased best by enlarging the heat transfer surface. However, there exist practical limitations to enlarging the heat transfer surface of the melter because of the difficulty of distributing the polymer flakes over the entire area of a large melter surface without bridging of the flakes. Bridging results when the polymer particles become jammed at some point in their path and cannot migrate to the heated surface.

Both high tenacity yarns and heavy denier filament yarns having non-circular cross sections made from synthetic thermoplastic polymers require high viscosity polymer. The need for a high capacity melting device that can be used with single spinning blocks, thus, is intensified. Mechanically forcing the polymer to flow or move across the heating surface, of course, will remove restrictions imposed by permitting the polymer simply to gravitate along the heating surface of the melter grid. A number of proposals have been made for mechanically moving the polymer across the heating surface without notable success.

Many types of screw conveyers have been used heretofore for propelling granules of thermoplastic polymer while melting same into a viscous liquid capable of being extruded into a variety of strands. Such devices for changing thermoplastic material from a solid to liquid have not found success in individual spinning blocks for melting spinning thermoplastic material into filaments. However, power driven screws have been suggested for conveying thermoplastic particles to the melter grid and for conveying the resulting melt away from the melt pool through spinnerets to form filaments.

Screw extruders which have been used to convey and melt thermoplastic material in particulate form to multiple spinning blocks have long polymer transfer lines. Such apparatus is too large and unwieldy to be used for individual screw melters in single unit melt spinning apparatus.

A major problem exists in feeding particles of polymer to known screw melters when the particles contain more than about 0.2 percent moisture. The back flow of water vapor tends to condense on the incoming cold particles and to cause same to adhere together, thereby bridging or jamming the inlet to the screw barrel. This, of course, interrupts the flow of the polymer. Thus, when nylon or like polymer is processed with known screws, the polymer must be pre-dried to a very low moisture content.

It is an object of the present invention to provide a new and useful screw conveying apparatus for propelling material from one point to another.

It is another object of the present invention to provide a high capacity screw melter for thermoplastic particles.

It is yet another object of the present invention to provide a compact, efficient high-capacity screw melter for thermoplastic material, which is especially suited for supplying polymeric melt to individual melt spinning units such as those used in spinning nylons, polyolefins, polystyrenes, polyesters, and other synthetic polymers into strands.

It is still another object of the present invention to provide new and improved apparatus for melt spinning filaments.

Other objects will become apparent from the following detailed description.

Generally speaking, the screw conveying apparatus of the present invention for propelling material from one point to another includes a stator having annular walls substantially concentric with respect to the axis of the stator and a power driven rotor having annular walls substantially concentric with respect to the axis of the rotor. The walls of the rotor and the walls of the stator are positioned concentrically within one another so that opposed walls thereof define a plurality of annular concentric connected conveying paths. A screw flight projects from one side of the opposed walls in each of the conveying paths to move the material under pressure continuously along the conveying paths alternately in one direction and then generally in the opposite direction when the rotor turns.

When the screw conveying apparatus is used for propelling and melting thermoplastic material in particulate form, the apparatus includes means for supplying such material to the entrance end of the conveying paths and means for exchanging heat with the material as same is propelled along the conveying paths. Preferably, the screw flights and the rotation of the rotor are such that the material moves under pressure axially inward along the annular conveying paths. In this case, the thermoplastic material is supplied to the entrance end of the outermost path of the annular conveying paths; and the resulting melted thermoplastic material is withdrawn from the exit end of the intermost path of the annular conveying paths.

In a preferred embodiment of the screw conveying apparatus for propelling and melting thermoplastic material, alternate stator walls diverge upwardly and are joined together at their ends to form at least one annular trough. The walls of the driven rotor converge downwardly and are joined together at their bottom ends. Good results are obtained when the stator and rotor each have two walls.

For melt spinning thermoplastic material into filamentary structures, the apparatus includes conduit means for withdrawing the melted material from the exit end of the conveying paths and for delivering the melted material to a spinneret for extrusion into filaments or the like. Pump means can be positioned within the conduit means for metering the melted material to the spinneret.

Figure 1:
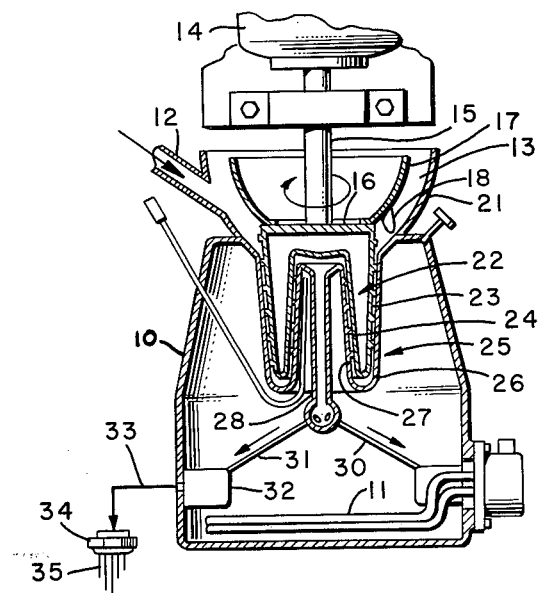
FIGURE 1 is a cross-sectional view of a preferred form of the apparatus for melt spinning thermoplastic particles.

With reference to FIGURE 1, the apparatus includes a generally cylindrical container 10 suitably mounted to be non-rotative. This container confines a conventional heat exchanging vapor such as biphenyl, diphenyl oxide or the like. Normally, the container will be suitably insulated. For convenience of illustration, the container is not shown as being insulated. An electrically energizable cartridge type heater 11 is immersed in a pool of heat exchanging liquid and serves as heat source for maintaining the heat exchanging vapor at the desired temperature.

Thermoplastic material in particulate form usually is supplied through feed chute or conduit 12 to maintain a suitable quantity of the material in vessel or annulus 13. Electric motor 14 drives shaft 15. Fixedly mounted to the end of shaft are a plate 16 and a curved cup-forming annular wall 17. Carried on the wall is a downwardly projecting finger 18 for distributing the thermoplastic particles evenly around the annulus 13 defined by wall 17 and outer cup-forming annular wall 21 mounted at the top of container 10.

Rotor 22 is fixed to plate 16 and thus is rotatably driven by the electric motor 14. Annular outer wall 23 of the rotor and the annular inner wall 24 of the rotor converge downwardly and are joined together at their bottom ends. As shown, only the outer wall is provided with a screw flight. Stator 25 constructed of heat conductive material includes generally upward extending annular walls 26 and 27 diverging upwardly and positioned in mating closely spaced relationship with walls 23 and 24. Walls 26 and 27 are fixed to container 10. The face of wall 27 is provided with a screw flight. Walls 26 and 27 are joined at their lower ends to form an annular trough into which the rotor projects so that opposed walls of the rotor and stator define two annular concentric connected conveying paths. As screw flight projects from only one side of the opposed walls in each of the conveying paths so that during rotation of the rotor the thermoplastic material is moved under pressure axially inward continuously along the annular conveying paths first in a generally downward direction and then in a generally upward direction. As the material moves it is heated by the hot vapor within container 10, heat exchanging occurring through stator 25.

Conduit 28 is provided to receive melted thermoplastic material normally overflowing from the exit end of the screw conveying path. Since this conduit is disposed within container 10, the material therein will be maintained at the desired temperature. Lines 30 and 31 subdivide the molten polymer for subsequent delivery to a desired number of points of extrusion. Pump 32 meters the polymer through line 33 and the orifices of spinneret 34 to form a plurality of melt spun filaments 35.

In operation of the embodiment shown in FIGURE 1, the system is heated to the proper operating temperature; and shaft 15 is rotated as indicated. Then, thermoplastic particles are admitted through conduit 12. The particles flow into the screw. As they move against the heated stator 25, the particles fuse and become liquid. The movement of the material is downward and then upward. The resulting melt flows downward through conduit 28 and is carried, for example, by line 31 to pump 32. This pump meters the melt through a spinneret 34 where the melt is extruded into filaments 35.

It is to be noted that all along its path the melt is directly heated. One might expect that a stagnant region would occur at the points of flow reversal. However, such is not the case; the motion of the rotor relative to the stator maintains the melt under high shear at all parts of its path. Physical uniformity and temperature uniformity of polymer delivered to pump 32 are excellent.

Pressure of the melt continually rises until maximum pressure occurs at the inlet end of conduit 28. The static pressure of the melt exerts a force vertically upward upon the rotor. Similarly, the drag force on the external screw of the rotor has a vertical component in the upward direction. Conversely, the drag force on the inner surface of the rotor has a vertical component directed downward. Therefore, the drag force components tend to compensate each other partially. There is, then, a net thrust upward which must be sustained by the rotor shaft bearing.

Rotor 22 normally will have its internal space filled with a thermal insulating material. This insulation reduces external heat loss at the top of the rotor. However, for certain types of melt with a very narrow softening temperature range, it may be desirable to positively heat the rotor with a suitable heat source.

The apparatus of this invention can successfully melt thermoplastic material and pump the resulting melt that would jam an ordinary screw extruder. The feed particles can be maintained in a relatively shallow stirred bed in annulus 13; and back flow of moisture or other volatile substances can escape at any point around the periphery of the outer screw flight. Hence, with this arrangement disengagement of moisture or other volatiles can readily occur. The escape of residual moisture from the annulus will exclude air from contacting the melt or highly heated polymer particles. Nylon-66 flake with as much as 1% moisture can flow quite readily. Instead of excluding air by means of the escaping moisture, one may employ a blanket of inert gas such as argon or nitrogen to minimize polymer degradation.

Figure 2:
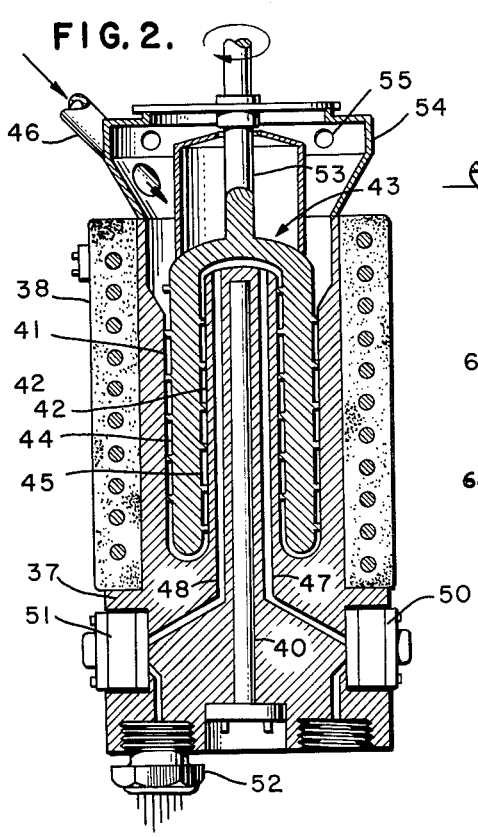
FIGURE 2 is a cross-sectional view of a second form of the apparatus wherein the rotor and stator have vertical concentric cylindrical walls.

In FIGURE 2 a spinning block 37 is heated by electrical resistance heaters. A molded peripheral heating jacket 38 is employed for doing this. A single cartridge heater 40 extends along the central axis of the block. While direct electrical heating is not entirely suitable in some conventional melt spinning apparatus, such heating is highly satisfactory for use in the apparatus of the present invention, since the polymer is in forced flow at all times so that local overheating is negligible. Block 37 is stationary and functions as the stator. The block has two upwardly extending parallel annular walls 41 and 42. Rotor 43 has two downward extending parallel annular walls 44 and 45, each being provided with a screw flight. The rotor walls are positioned in mating closely spaced relationship with walls 41 and 42.

Chute or feed conduit 46 is provided for supplying thermoplastic material to the screw conveying apparatus. As in the embodiment of FIGURE 1, when the rotor is turned the thermoplastic material is moved axially inwardly under pressure continuously while being heated along an annular inflowing conveying path first in a generally downward direction and then in a generally upward direction. Lines 47 and 48 in block 37 carry the melted polymer to pumps 50 and 51. Pump 51 meters the polymer to spinneret 52 for extrusion into filaments or the like. Rotor shaft 53 is power driven by means (not shown). Vessel or housing 54 for containing the particulate material entering the outside screw flight is provided with circumferentially disposed vent ports 55 through which escaping gases can flow.

Figure 3:
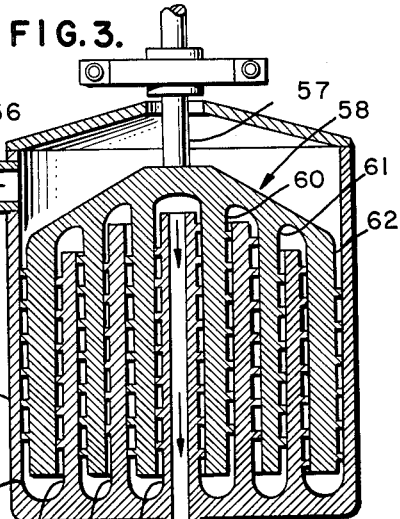
FIGURE 3 is a cross-sectional view of a third form of the apparatus illustrating schematically a six-stage screw pump.

In FIGURE 3 the screw conveying apparatus is shown schematically. Material to be conveyed enters through feed conduit 56. Shaft 57 is suitably driven and powers rotor 58. The rotor has three downwardly extending vertical annular walls 60–62, each having a suitable screw flight. Stator 63 has four upwardly extending annular walls 64–67, each of the latter three on their outer side having a suitable screw flight. As can be seen, when the rotor is turned, the material is moved axially inwardly under pressure in upward and downward directions. The conveyed material overflows into condit 68 as illustrated. The material, which can be for example a spinning solution, moves to a metering pump 70 and through the orifices of spinneret 71 so as to form filaments 72. Obviously, the apparatus can be provided with suitable heating means if it is desired to heat the material being propelled by the apparatus.

Figure 4:
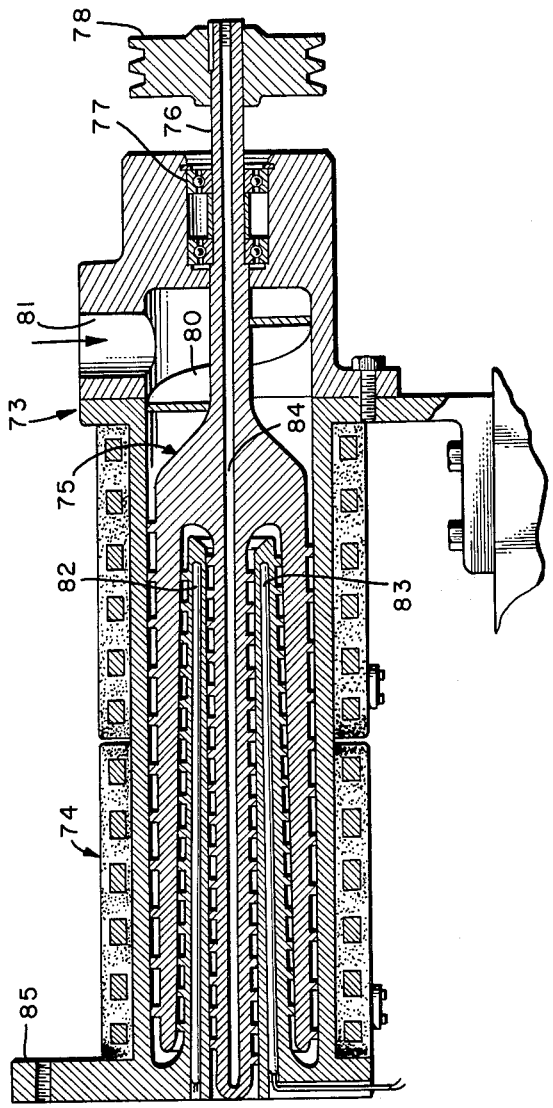
FIGURE 4 is a cross-sectional view of a fourth form of the apparatus illustrating a three-stage horizontal screw conveyer.

In FIGURE 4 a horizontally disposed screw conveying apparatus for propelling and melting thermoplastic material is shown. Stator 73 is provided with a molded heater cozy 74 for heating same to a suitable temperature. The stator has horizontal extending annular walls substantially concentric with respect to the axis thereof. A rotor 75 has generally horizontal extending annular walls substantially concentric with respect to the axis thereof. These walls are positioned within the walls of the stator in closely spaced relationship therewith to define a plurality of annular connected conveying paths. Rotor shaft 76 journalled by bearings 77 is fixedly mounted to pulley 78 suitably driven by means (not shown). A screw flight projects from only one side of the opposed walls in each of the conveying paths to move the material under pressure axially inward along the conveying paths. The screw flights are of the same hand and slightly tapered for ease of disassembly. Spiral impelling means 80 is provided for supplying thermoplastic material to the entrance end of the outermost path, the material entering the system through inlet 81. Electrically energizable cartridge heaters 82 and 83 are radially equi-spaced between the second and third melt conveying stages. Hollow core 84 can be utilized for additional heat exchanging or for accommodating temperature sensing elements. Flange 85 is provided for attachment of transfer line, breaker plate, die, etc., thereto.

It should be noted that the screw flights can be tapered or straight, the thread depth or root diameter may increase or decrease along the screw, and the lead or pitch of the screw may be varied as necessary. For reasons given below, a slightly tapered screw is preferred to a straight screw. A female rather than male helix may be utilized so that there are many different combinations possible for optimum performance with a given polymer or viscous fluid.

Conventional screw extruders may be described in terms of the principal function of the parts thereof. For example, the inlet section or feed section is usually a short low pressure section with very deep threads; the feed section may be followed by an intermediate section and a high pressure metering section which is frequently quite long with shallow threads having a relatively short pitch. All sections of the known screws are in line along the same axis. For an analogous nomenclature applied to the screw conveying apparatus of the present invention, the successive sections herein are called stages, there being a reversal of flow direction between each stage. The screw conveying apparatus of FIGURES 1 and 2 are two-stage conveyers. The number of stages may be more than two, depending upon the particular application. For screw melters to be used at individual spinning blocks in melt spinning apparatus, it is generally preferable to utilize only two or three stages because of simplicity of construction and the fact that the melt is usually delivered at only moderate pressure, say not greater than 1000 p.s.i.

Although emphasis thus far has been upon high pressure conveying in which the pump stages are serially connected, the invention is not limited thereto. With some minor modifications in the structure of the rotor and stator elements, the stages may act in parallel to give a very high capacity, low pressure pump, the effect being the same as having several short single-stage pumps propelling material from the same feed source.

For certain applications, particularly in conveying materials requiring little to no external heat to maintain same in a fluid condition, a multistage conveyer may be desirable. FIGURE 3 illustrates such a device.

Proper choice of screw direction (hand) should be made. In the apparatus of FIGURE 1 the screw thread on the rotor and the screw thread on the stator are both of the same hand, left-hand as illustrated. This follows from the fact that viewed in the direction of flow, the rotation relative to the barrels is clockwise for both rotor screw and stator screw. Accordingly, the male and female threads on rotor 43 in FIGURE 2 must be of opposite hand; as shown, the male thread is a left-hand screw while the female thread is right-hand.

The screw may be either tapered or straight. The straight screw is usually easier to fabricate; but some highly viscoelastic polymeric melts require a tapered screw. For melters in general, at least a slight taper to the screw is desired for operational reasons. Firstly, the tapered screw rotor can be pulled out for overhaul more easily than a straight screw. Secondly a tapered screw makes possible another means of varying the pressure and flow pattern of the fluid within the apparatus. For a given clearance between barrel and screw, the pressure and throughput are proportional to the rotor speed. With a tapered screw it is possible to change the clearance between barrel and screw.

In FIGURE 1, for instance, if rotor 22 is shifted upwardly, the clearance between barrels and screws will be increased. Conversely, a shift downwardly will decrease the clearance. For a given speed a wider clearance provides lower pressure and less throughput because of the increased slip-flow or internal recycling of the material being conveyed. It is thus possible to change the pressure range of the melter by adjusting the clearance. Furthermore, wear of the screw and barrel may be compensated by reducing the clearance. Moreover, dispersion of pigments or other additives in the melt may be improved by keeping the melt in the high shear field of the screw for a longer period of time by increasing the slip-flow. Hence, a tapered screw is usually preferred to a straight one.

From the preceding, it is clear that a high pressure screw conveyer can be made very compact according to the present invention. For example, a pump with a sixty-inch effective screw length can easily be shortened a length of less than twelve inches.

Heating of the screw conveyer of the present invention is much less critical than in melt spinning apparatus employing a melter grid. Since the polymer is maintained at a high rate of shear, heat transfer at the metal-polymer interface is no longer the controlling factor and occurrence of local overheating is quite unlikely. Consequently, electrical heaters as used in apparatus shown in FIGURES 2 and 4 are entirely satisfactory, as well as vapor heating depicted in FIGURE 1. It should be noted that a considerable amount of heat will be generated directly in the melt by dissipation of mechanical energy through internal friction. By proper choice of operating conditions, it is quite possible to supply all necessary heat for melting the polymer by mechanical energy alone, auxiliary heaters serving merely to compensate external heat losses.

Since they are not a vital part of the invention, control systems for the screw conveying apparatus is not discussed herein in detail. However, it should be understood that appropriate temperature and pressure-sensing devices normally will be located at critical points. Sensed temperature variations would be used to actuate control of the primary heating element, and sensed pressure variations would be used to control the rotor speed.

Materials of construction are chosen to withstand whatever corrosive and pressure conditions that exist in the process. Stainless steel alloys are entirely suitable. Since the rotor actually rides upon a thin film of polymer which lubricates the surfaces and insures self-centering of the rotor, good quality carbon steels are entirely satisfactory and are preferred because of their higher thermal conductivity and lower cost.

Polymers which can be melt spun into filaments by use of the apparatus include any suitable substance that can be melt spun. As examples of fiber-forming synthetic thermoplastic polymers capable of being melt spun the following may be mentioned: polyethylene; polypropylene; polycarbonates; polyurethanes; polystyrene; copolymers of vinyl acetate and vinyl chloride; the copolymers of vinylidene chloride and a minor proportion of vinyl chloride; linear polyesters of aromatic dicarboxylic acids and dihydric compounds, such as polymeric ethylene terephthalate and the polyester derived from the terephthalic acid or the like and bis-1,4-(hydroxymethyl) cyclohexane; linear polycarbonamides, such as polymeric hexamethylene adipamide, polymeric hexamethylene sebacamide, polymeric monoaminocarboxylic acids, such as polymeric 6-aminocaproic acid; and other fiber-forming thermoplastic polymers. Mixtures of polymers also can be used.

There are many advantages of the present apparatus over prior practice. Compared with an ordinary screw pump, the present device is much smaller and compact for comparable capacities. The stages may be operated in series for high pressure application or the stages may be used in parallel for high throughput operation. The material charged to the apparatus feeds into the screw around the entire periphery rather than through a restrictive slot. Furthermore, compared with an ordinary melter grid, polymer melt flow is independent of gravity and is forced to flow under conditions of high shear, thereby insuring good heat transfer at the metal-polymer interface. Homogenization of the melt also occurs. For equivalent space the screw-melter has much greater capacity than a gravity flow grid. Materials containing a modest amount of volatiles can be processed without the usual difficulties being encountered.

While the invention has been described in terms of preferred embodiments thereof, it is to be understood that variations from the details disclosed herein might be made without departing from the scope and spirit of the invention. Accordingly, the invention is to be limited only by the claims set forth hereinafter.

What is claimed is:

1. Screw conveying apparatus for propelling and melting thermoplastic material comprising:
   (a) a stator having two upward extending annular walls substantially concentric with respect to the axis of the stator, the stator walls diverging upwardly and joined together at their bottom ends to form an annular trough;
   (b) a rotor having two downward extending annular walls substantially concentric with respect to the axis of the rotor, the rotor walls converging downwardly and joined together at their bottom ends;
   (c) the rotor walls positioned in mating closely spaced relationship in said trough so that opposed walls of the stator and rotor define two annular concentric connected conveying paths;
   (d) means for rotating said rotor;
   (e) a screw flight projecting from only one side of the opposed walls in each of the conveying paths to move the material under pressure axially inward continuously along the annular conveying paths first in a generally downward direction and then in a generally upward direction;
   (f) a vessel positioned above the rotor for receiving the thermoplastic material in particulate form communicating with the entrance end of the outer path of the annular conveying paths;
   (g) means for supplying the thermoplastic material to said vessel;
   (h) means for supplying heat to melt the particulate thermoplastic material as same is propelled along the the annular conveying paths; and
   (i) a conduit for withdrawing the normally resulting melted thermoplastic material axially downward from the exit end of the inner path of the annular conveying paths.

2. Screw conveying apparatus for propelling and melting thermoplastic material comprising:
   (a) a stator having two upwardly extending annular walls substantially concentric with respect to the axis of the stator, the stator walls diverging upwardly and joined at their bottom ends to form an annular trough;
   (b) a rotor having two downward extending annular walls substantially concentric with respect to the axis of the rotor, the rotor walls converging downwardly and joined at their bottom ends;
   (c) the rotor walls positioned in mating closely spaced relationship in said trough so that opposed walls of the stator and rotor define two annular concentric conveying paths;
   (d) an electric motor for rotating said rotor;
   (e) a first screw flight projecting from the trough-forming inner wall of the stator;
   (f) a second screw flight projecting from the outer rotor wall, whereby the material is moved axially inwardly under pressure along the annular conveying paths first in a generally downward direction and then in a generally upward direction;
   (g) an annular open top vessel positioned above the rotor for receiving the thermoplastic material in particulate form communicating with the entrance end of the outer path of the annular conveying paths;
   (h) a chute for supplying the thermoplastic material to said vessel;
   (i) a heater for supplying a heating fluid in heat exchange relation with the walls of said stator; and
   (j) a conduit for withdrawing the normally resulting melted thermoplastic material axially downward from the exit end of the inner path of the annular conveying paths.

3. Apparatus for melt spinning thermoplastic material into filamentary structures comprising:

(a) a stator having a plurality of generally upward extending annular walls substantially concentric with respect to the axis of the stator, alternate stator walls diverging upwardly and joined together at their ends to form at least one annular trough;
(b) a rotor having a plurality of generally downward extending annular walls substantially concentric with respect to the axis of the rotor, the rotor walls converging downwardly and joined together at their bottom ends;
(c) the rotor walls positioned in mating closely spaced relationship in each of the said troughs so that opposed walls of the stator and rotor define a plurality of annular concentric connected conveying paths;
(d) electric motor means for rotating said rotor;
(e) a screw flight projecting from only one side of the opposed walls in each of the annular conveying paths to move the material under pressure axially inward continuously along the annular conveying paths alternately in one direction and then in the opposite direction;
(f) means for supplying thermoplastic material in particulate form to the entrance end of the outermost path of the annular conveying paths;
(g) means for supplying heat to melt the particulate thermoplastic material as same is propelled along the conveying paths;
(h) a spinneret positioned below said stator;
(i) a conduit for withdrawing the normally resulting melted thermoplastic material axially downward from the exit end of the innermost path of the annular conveying paths and for delivering the melted material to said spinneret for extrusion into filamentary structures; and
(j) pump means positioned in the said conduit for metering the melted thermoplastic material to the said spinneret.

4. Apparatus for melt spinning thermoplastic material into filamentary structures comprising:
(a) a stator having two upwardly extending annular walls substantially concentric with respect to the axis of the stator, the stator walls diverging upwardly and joined at their bottom ends to form an annular trough;
(b) a rotor having two downwardly extending annular walls substantially concentric with respect to the axis of the rotor, the rotor walls converging downwardly and joined at their bottom ends;
(c) the rotor walls positioned in mating closely spaced relationship in said trough so that opposed walls of the stator and rotor define two annular conveying paths;
(d) an electric motor for rotating said rotor;
(e) a first screw flight projecting from the trough-forming inner wall of the stator;
(f) a second screw flight projecting from the outer rotor wall, whereby the material is moved axially inwardly under pressure along the annular conveying paths first in a generally downward direction and then in a generally upward direction;
(g) an annular vessel positioned above the rotor for receiving the thermoplastic material in particulate form communicating with the entrance end of the outer path of the annular conveying paths;
(h) a chute for supplying the thermoplastic material to said vessel;
(i) a heater for supplying a heating fluid in heat exchange relation with the walls of said stator;
(j) a spinneret positioned below said stator;
(k) a conduit for withdrawing the normally resulting melted thermoplastic material axially downward from the exit end of the inner path of the annular conveying paths and for delivering the melted material to said spinneret for extrusion into filamentary structures; and
(l) a pump positioned in said conduit for metering the melted thermoplastic material to said spinneret.

5. Apparatus for melt spinning thermoplastic material into filamentary structures comprising in combination,
(a) a hollow container providing a single heat chamber and defining a deep exterior annular trough surrounded by said single heat chamber, said annular trough being defined by opposed spaced inner and outer container walls joined at one end thereof,
(b) the walls of said container defining a central passage extending into said heat chamber and open at one end thereof to said annular trough,
(c) a screw flight formed about said inner wall defining said annular trough,
(d) means opening into said single heat chamber for supplying a heating agent thereto,
(e) heater means for heating said heating agent within said heat chamber,
(f) pump means within said heat chamber, said pump means being connected to the other end of said central passage,
(g) spinneret means connected to said pump means,
(h) hollow rotor means adapted for rotation within said annular trough, said rotor means having connected inner and outer walls positioned in complementary relation to said inner and outer container walls defining said annular trough, respectively, forming a continuous reverse path connecting at one end thereof with said central passage,
(i) a screw flight formed on said outer wall of said rotor means, said rotor screw flight and said screw flight formed on said inner container wall defining said annular trough cooperating to form on continuous screw flight, and
(j) a conduit opening into the other end of said continuous reverse path for supplying a polymer thereto.

6. Apparatus for melt spinning as in claim 5 wherein inner and outer walls of said rotor means are tapered and wherein said inner and outer container walls defining said trough are correspondingly tapered.

References Cited by the Examiner

UNITED STATES PATENTS

| | | | |
|---|---|---|---|
| 2,653,351 | 9/53 | Henning | 18—12 |
| 2,707,306 | 5/55 | Weber et al. | 18—8 |
| 2,791,802 | 5/57 | Weber | 18—8 |
| 3,102,694 | 9/63 | Frankel | 18—12 X |

FOREIGN PATENTS 869,739  11/41  France.

OTHER REFERENCES

German Auslegeschrift, 1,092,184, printed Nov. 3, 1960.

WILLIAM J. STEPHENSON, *Primary Examiner.*

ROBERT F. WHITE, *Examiner.*